United States Patent
Reddy et al.

(10) Patent No.: US 10,404,481 B2
(45) Date of Patent: Sep. 3, 2019

(54) UNAUTHORIZED PARTICIPANT DETECTION IN MULTIPARTY CONFERENCING BY COMPARING A REFERENCE HASH VALUE RECEIVED FROM A KEY MANAGEMENT SERVER WITH A GENERATED ROSTER HASH VALUE

(71) Applicant: Cisco Technology, Inc., San Jose, CA (US)

(72) Inventors: K Tirumaleswar Reddy, Karnataka (IN); Ram Mohan Ravindranath, Karnataka (IN); Kaustubh Inamdar, Karnataka (IN); Gonzalo Salgueiro, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 154 days.

(21) Appl. No.: 15/615,270

(22) Filed: Jun. 6, 2017

(65) Prior Publication Data

US 2018/0351757 A1    Dec. 6, 2018

(51) Int. Cl.
*H04L 12/18* (2006.01)
*H04L 29/06* (2006.01)

(52) U.S. Cl.
CPC ...... *H04L 12/1822* (2013.01); *H04L 12/1818* (2013.01); *H04L 63/0457* (2013.01); *H04L 63/062* (2013.01); *H04L 63/166* (2013.01)

(58) Field of Classification Search
CPC ............... H04L 12/1822; H04L 63/205; H04L 12/1818; H04L 63/0457; H04L 63/062; H04L 63/166
See application file for complete search history.

(56) References Cited

U.S. PATENT DOCUMENTS

| | | | |
|---|---|---|---|
| 3,775,563 A | * | 11/1973 | Klein ...................... H04M 3/56 348/14.07 |
| 4,460,807 A | | 7/1984 | Kerr et al. |

(Continued)

FOREIGN PATENT DOCUMENTS

| | | |
|---|---|---|
| CN | 101055561 | 10/2007 |
| CN | 102572370 | 7/2012 |

(Continued)

OTHER PUBLICATIONS

Author Unknown, "A Primer on the H.323 Series Standard," Version 2.0, available at http://www.packetizer.com/voip/h323/papers/primer/, retrieved on Dec. 20, 2006, 17 pages.

(Continued)

*Primary Examiner* — Daniel C. Murray
(74) *Attorney, Agent, or Firm* — Polsinelli PC (57) ABSTRACT

The disclosed technology addresses the need in the art for a detecting an unauthorized participant in a multiparty conferencing session. A system is configured to join a conferencing session, obtain a roster for the conferencing session via a Session Initiation Protocol (SIP) channel, and generate a roster hash value based on the roster. The system may further receive a reference hash value from a key management server and compare the reference hash value with the roster hash value. The system may determine that the roster is invalid when the reference hash value does not match the roster hash value.

20 Claims, 5 Drawing Sheets

(56) References Cited

U.S. PATENT DOCUMENTS

| | | | |
|---|---|---|---|
| 4,890,257 A | 12/1989 | Anthias et al. | |
| 5,694,563 A | 12/1997 | Belfiore et al. | |
| 5,699,082 A | 12/1997 | Marks et al. | |
| 5,745,711 A | 4/1998 | Kitahara et al. | |
| 5,767,897 A | 6/1998 | Howell | |
| 5,825,858 A | 10/1998 | Shaffer et al. | |
| 5,874,962 A | 2/1999 | de Judicibus et al. | |
| 5,959,662 A * | 9/1999 | Shaffer | H04N 7/15 348/14.01 |
| 5,995,096 A | 11/1999 | Kitahara et al. | |
| 6,040,817 A | 3/2000 | Sumikawa | |
| 6,075,531 A | 6/2000 | DeStefano | |
| 6,085,166 A | 7/2000 | Beckhardt et al. | |
| 6,191,807 B1 | 2/2001 | Hamada et al. | |
| 6,286,006 B1 * | 9/2001 | Bharat | G06F 17/30902 |
| 6,300,951 B1 | 10/2001 | Filetto et al. | |
| 6,327,352 B1 * | 12/2001 | Betts | H04L 63/14 379/114.14 |
| 6,392,674 B1 | 5/2002 | Hiraki et al. | |
| 6,463,473 B1 | 10/2002 | Gubbi | |
| 6,487,555 B1 * | 11/2002 | Bharat | G06F 17/30864 |
| 6,554,433 B1 | 4/2003 | Holler | |
| 6,573,913 B1 | 6/2003 | Butler et al. | |
| 6,646,997 B1 | 11/2003 | Baxley et al. | |
| 6,665,396 B1 | 12/2003 | Khouri et al. | |
| 6,711,419 B1 | 3/2004 | Mori | |
| 6,718,361 B1 * | 4/2004 | Basani | H04L 67/1095 707/999.01 |
| 6,748,447 B1 * | 6/2004 | Basani | H04L 67/1095 709/219 |
| 6,754,321 B1 | 6/2004 | Innes et al. | |
| 6,754,335 B1 | 6/2004 | Shaffer et al. | |
| RE38,609 E | 10/2004 | Chen et al. | |
| 6,851,053 B1 * | 2/2005 | Liles | H04L 12/1818 370/261 |
| 6,865,264 B2 | 3/2005 | Berstis | |
| 6,879,673 B2 * | 4/2005 | Creamer | H04M 3/382 379/202.01 |
| 7,058,164 B1 | 6/2006 | Chan et al. | |
| 7,058,710 B2 | 6/2006 | McCall et al. | |
| 7,062,532 B1 | 6/2006 | Sweat et al. | |
| 7,085,367 B1 | 8/2006 | Lang | |
| 7,124,164 B1 | 10/2006 | Chemtob | |
| 7,149,499 B1 | 12/2006 | Oran et al. | |
| 7,180,993 B2 | 2/2007 | Hamilton | |
| 7,209,475 B1 | 4/2007 | Shaffer et al. | |
| 7,266,188 B2 * | 9/2007 | Carlson | H04M 3/382 379/202.01 |
| 7,308,090 B2 * | 12/2007 | White | H04M 3/42382 379/202.01 |
| 7,343,008 B1 * | 3/2008 | Frankel | H04M 3/56 370/260 |
| 7,418,664 B2 | 8/2008 | Ben-Shachar et al. | |
| 7,441,198 B2 | 10/2008 | Dempski et al. | |
| 7,478,339 B2 | 1/2009 | Pettiross et al. | |
| 7,530,022 B2 | 5/2009 | Ben-Shachar et al. | |
| 7,620,902 B2 | 11/2009 | Manion et al. | |
| 7,634,533 B2 | 12/2009 | Rudolph et al. | |
| 7,792,277 B2 | 9/2010 | Shaffer et al. | |
| 7,881,450 B1 | 2/2011 | Gentle et al. | |
| 7,920,160 B2 | 4/2011 | Tamaru et al. | |
| 7,956,869 B1 | 6/2011 | Gilra | |
| 8,059,557 B1 | 11/2011 | Sigg et al. | |
| 8,081,205 B2 | 12/2011 | Baird et al. | |
| 8,243,904 B2 * | 8/2012 | Lingafelt | H04L 12/1822 348/14.08 |
| 8,274,893 B2 | 9/2012 | Bansal et al. | |
| 8,290,998 B2 | 10/2012 | Stienhans et al. | |
| 8,295,446 B1 * | 10/2012 | Apple | H04M 15/08 379/88.01 |
| 8,301,883 B2 | 10/2012 | Sundaram et al. | |
| 8,340,268 B2 | 12/2012 | Knaz | |
| 8,358,327 B2 | 1/2013 | Duddy | |
| 8,428,234 B2 | 4/2013 | Knaz | |
| 8,434,019 B2 | 4/2013 | Nelson | |
| 8,456,507 B1 | 6/2013 | Mallappa et al. | |
| 8,462,103 B1 | 6/2013 | Moscovitch et al. | |
| 8,478,848 B2 | 7/2013 | Minert | |
| 8,494,142 B2 * | 7/2013 | Lingafelt | H04L 12/1822 379/202.01 |
| 8,630,208 B1 | 1/2014 | Kjeldaas | |
| 8,638,354 B2 | 1/2014 | Leow et al. | |
| 8,675,847 B2 | 3/2014 | Shaffer et al. | |
| 8,694,587 B2 | 4/2014 | Chaturvedi et al. | |
| 8,694,593 B1 | 4/2014 | Wren et al. | |
| 8,706,539 B1 | 4/2014 | Mohler | |
| 8,831,505 B1 | 9/2014 | Seshadri | |
| 8,850,203 B2 | 9/2014 | Sundaram et al. | |
| 8,890,924 B2 | 11/2014 | Wu | |
| 8,892,646 B2 | 11/2014 | Chaturvedi et al. | |
| 8,924,862 B1 | 12/2014 | Luo | |
| 8,930,840 B1 | 1/2015 | Riskó et al. | |
| 9,031,839 B2 | 5/2015 | Thorsen et al. | |
| 9,032,028 B2 | 5/2015 | Davidson et al. | |
| 9,118,612 B2 | 8/2015 | Fish et al. | |
| 9,131,017 B2 | 9/2015 | Kurupacheril et al. | |
| 9,137,376 B1 | 9/2015 | Basart et al. | |
| 9,143,729 B2 | 9/2015 | Anand et al. | |
| 9,197,701 B1 | 11/2015 | Petrov et al. | |
| 9,197,848 B2 | 11/2015 | Felkai et al. | |
| 9,201,527 B2 | 12/2015 | Kripalani et al. | |
| 9,204,099 B2 | 12/2015 | Brown | |
| 9,268,398 B2 | 2/2016 | Tipirneni | |
| 9,298,342 B2 | 3/2016 | Zhang et al. | |
| 9,323,417 B2 | 4/2016 | Sun et al. | |
| 9,335,892 B2 | 5/2016 | Ubillos | |
| 9,344,681 B2 * | 5/2016 | Block | H04L 65/4023 |
| 9,349,119 B2 | 5/2016 | Desai et al. | |
| 9,367,224 B2 | 6/2016 | Ananthakrishnan et al. | |
| 9,369,673 B2 | 6/2016 | Ma et al. | |
| 9,407,621 B2 | 8/2016 | Vakil et al. | |
| 9,432,512 B2 | 8/2016 | You | |
| 9,449,303 B2 | 9/2016 | Underhill et al. | |
| 9,495,664 B2 | 11/2016 | Cole et al. | |
| 9,516,022 B2 | 12/2016 | Borzycki et al. | |
| 9,525,711 B2 | 12/2016 | Ackerman et al. | |
| 9,553,799 B2 | 1/2017 | Tarricone et al. | |
| 9,563,480 B2 | 2/2017 | Messerli et al. | |
| 9,609,030 B2 | 3/2017 | Sun et al. | |
| 9,609,514 B2 * | 3/2017 | Mistry | H04W 12/06 |
| 9,614,756 B2 | 4/2017 | Joshi | |
| 9,667,799 B2 | 5/2017 | Olivier et al. | |
| 9,762,709 B1 | 9/2017 | Snyder et al. | |
| 2002/0018051 A1 | 2/2002 | Singh | |
| 2002/0076003 A1 | 6/2002 | Zellner et al. | |
| 2002/0078153 A1 | 6/2002 | Chung et al. | |
| 2002/0141388 A1 * | 10/2002 | Schwartz | H04M 1/72566 370/352 |
| 2002/0143851 A1 * | 10/2002 | Schwartz | H04L 29/06 709/201 |
| 2002/0188522 A1 | 12/2002 | McCall et al. | |
| 2003/0028647 A1 | 2/2003 | Grosu | |
| 2003/0046421 A1 | 3/2003 | Horvitz et al. | |
| 2003/0174826 A1 | 9/2003 | Hesse | |
| 2003/0197739 A1 | 10/2003 | Bauer | |
| 2003/0227423 A1 | 12/2003 | Arai et al. | |
| 2004/0054885 A1 | 3/2004 | Bartram et al. | |
| 2004/0098456 A1 | 5/2004 | Krzyzanowski et al. | |
| 2004/0141605 A1 * | 7/2004 | Chen | H04M 3/42221 379/202.01 |
| 2004/0170265 A1 * | 9/2004 | Benco | H04M 3/56 379/202.01 |
| 2004/0210637 A1 | 10/2004 | Loveland | |
| 2004/0267938 A1 | 12/2004 | Shoroff et al. | |
| 2005/0014490 A1 | 1/2005 | Desai et al. | |
| 2005/0018827 A1 * | 1/2005 | Himmel | H04L 12/1813 379/202.01 |
| 2005/0021619 A1 * | 1/2005 | Gomes de Oliveira | H04L 12/1813 709/204 |
| 2005/0055405 A1 | 3/2005 | Kaminsky et al. | |
| 2005/0055412 A1 | 3/2005 | Kaminsky et al. | |

(56) References Cited

U.S. PATENT DOCUMENTS

| | | |
|---|---|---|
| 2005/0085243 A1 | 4/2005 | Boyer et al. |
| 2005/0099492 A1 | 5/2005 | Orr |
| 2005/0108328 A1 | 5/2005 | Berkeland et al. |
| 2005/0215229 A1 | 9/2005 | Cheng |
| 2005/0265537 A1* | 12/2005 | Verbil .............. H04M 3/56 379/207.13 |
| 2006/0004911 A1 | 1/2006 | Becker et al. |
| 2006/0026255 A1 | 2/2006 | Malamud et al. |
| 2006/0126848 A1* | 6/2006 | Park ................ H04L 9/3271 380/277 |
| 2006/0164552 A1 | 7/2006 | Cutler |
| 2006/0182249 A1* | 8/2006 | Archambault ...... H04L 12/1818 379/202.01 |
| 2006/0224430 A1 | 10/2006 | Butt |
| 2006/0250987 A1 | 11/2006 | White et al. |
| 2007/0005752 A1 | 1/2007 | Chawla et al. |
| 2007/0038579 A1* | 2/2007 | Ansley .............. G06Q 20/382 705/64 |
| 2007/0041366 A1 | 2/2007 | Vugenfirer et al. |
| 2007/0071203 A1* | 3/2007 | Boyer ................ H04M 1/67 379/158 |
| 2007/0091831 A1 | 4/2007 | Croy et al. |
| 2007/0100986 A1 | 5/2007 | Bagley et al. |
| 2007/0116225 A1 | 5/2007 | Zhao et al. |
| 2007/0139626 A1 | 6/2007 | Saleh et al. |
| 2007/0150583 A1* | 6/2007 | Asthana ............. G06Q 10/06 709/224 |
| 2007/0171898 A1* | 7/2007 | Salva ............... H04L 29/06027 370/356 |
| 2007/0198637 A1 | 8/2007 | Deboy et al. |
| 2007/0250567 A1 | 10/2007 | Graham et al. |
| 2007/0265903 A1* | 11/2007 | Blair ................. G06Q 10/109 705/7.19 |
| 2008/0013706 A1* | 1/2008 | Kelley .............. G06Q 10/109 379/202.01 |
| 2008/0068447 A1 | 3/2008 | Mattila et al. |
| 2008/0080532 A1 | 4/2008 | O'Sullivan et al. |
| 2008/0209452 A1 | 8/2008 | Ebert et al. |
| 2008/0232277 A1* | 9/2008 | Foo ................. H04L 12/1822 370/260 |
| 2009/0012963 A1 | 1/2009 | Johnson et al. |
| 2009/0025062 A1* | 1/2009 | Gustave ............. G06F 21/33 726/4 |
| 2009/0100142 A1 | 4/2009 | Stern et al. |
| 2009/0193327 A1 | 7/2009 | Roychoudhuri et al. |
| 2009/0254619 A1 | 10/2009 | Kho et al. |
| 2009/0256901 A1 | 10/2009 | Mauchly et al. |
| 2009/0292999 A1 | 11/2009 | LaBine et al. |
| 2009/0309846 A1 | 12/2009 | Trachtenberg et al. |
| 2010/0005142 A1 | 1/2010 | Xiao et al. |
| 2010/0061538 A1 | 3/2010 | Coleman et al. |
| 2010/0070640 A1 | 3/2010 | Allen, Jr. et al. |
| 2010/0073454 A1 | 3/2010 | Lovhaugen et al. |
| 2010/0094867 A1 | 4/2010 | Badros et al. |
| 2010/0121959 A1 | 5/2010 | Lin et al. |
| 2010/0157978 A1 | 6/2010 | Robbins et al. |
| 2010/0211872 A1 | 8/2010 | Rolston et al. |
| 2010/0245535 A1 | 9/2010 | Mauchly |
| 2010/0262925 A1 | 10/2010 | Liu et al. |
| 2010/0303227 A1 | 12/2010 | Gupta |
| 2010/0316207 A1 | 12/2010 | Brunson |
| 2010/0318399 A1 | 12/2010 | Li et al. |
| 2011/0075830 A1 | 3/2011 | Dreher et al. |
| 2011/0131498 A1 | 6/2011 | Chao et al. |
| 2011/0135082 A1* | 6/2011 | Lingafelt ........... H04L 12/1822 379/203.01 |
| 2011/0135083 A1* | 6/2011 | Lingafelt ........... H04L 12/1822 379/203.01 |
| 2011/0264928 A1 | 10/2011 | Hinckley |
| 2011/0270609 A1 | 11/2011 | Jones et al. |
| 2011/0271209 A1* | 11/2011 | Jones ............... H04L 12/1827 715/753 |
| 2011/0271211 A1 | 11/2011 | Jones et al. |
| 2011/0283226 A1 | 11/2011 | Basson et al. |
| 2011/0314139 A1 | 12/2011 | Song et al. |
| 2012/0013704 A1 | 1/2012 | Sawayanagi et al. |
| 2012/0084714 A1 | 4/2012 | Sirpal et al. |
| 2012/0179502 A1 | 7/2012 | Farooq et al. |
| 2012/0190386 A1 | 7/2012 | Anderson |
| 2012/0224021 A1* | 9/2012 | Begeja ............. H04N 7/147 348/14.08 |
| 2012/0246229 A1 | 9/2012 | Carr et al. |
| 2012/0246596 A1 | 9/2012 | Ording et al. |
| 2012/0281823 A1* | 11/2012 | Colbert .............. H04M 3/563 379/202.01 |
| 2012/0284635 A1 | 11/2012 | Sitrick et al. |
| 2012/0296957 A1 | 11/2012 | Stinson et al. |
| 2012/0306757 A1 | 12/2012 | Keist et al. |
| 2012/0306993 A1 | 12/2012 | Sellers-Blais |
| 2013/0007635 A1* | 1/2013 | Michaelis ............ H04M 3/56 715/753 |
| 2013/0038675 A1 | 2/2013 | Malik |
| 2013/0041947 A1* | 2/2013 | Sammon ............ H04L 12/1822 709/204 |
| 2013/0047093 A1 | 2/2013 | Reuschel et al. |
| 2013/0050398 A1 | 2/2013 | Krans et al. |
| 2013/0060592 A1* | 3/2013 | Motoyama ........ G06Q 10/1095 705/7.19 |
| 2013/0063542 A1 | 3/2013 | Bhat et al. |
| 2013/0090065 A1 | 4/2013 | Fisunenko et al. |
| 2013/0091205 A1 | 4/2013 | Kotler et al. |
| 2013/0091440 A1 | 4/2013 | Kotler et al. |
| 2013/0135837 A1 | 5/2013 | Kemppinen |
| 2013/0141371 A1 | 6/2013 | Hallford et al. |
| 2013/0148789 A1 | 6/2013 | Hillier et al. |
| 2013/0185672 A1 | 7/2013 | McCormick et al. |
| 2013/0198629 A1 | 8/2013 | Tandon et al. |
| 2013/0215215 A1 | 8/2013 | Gage et al. |
| 2013/0219278 A1 | 8/2013 | Rosenberg |
| 2013/0222246 A1 | 8/2013 | Booms et al. |
| 2013/0225080 A1 | 8/2013 | Doss et al. |
| 2013/0227433 A1 | 8/2013 | Doray et al. |
| 2013/0239180 A1* | 9/2013 | Weller .............. G06Q 10/101 726/4 |
| 2013/0290421 A1 | 10/2013 | Benson et al. |
| 2013/0294594 A1* | 11/2013 | Chervets ............ H04M 3/56 379/202.01 |
| 2013/0297704 A1 | 11/2013 | Alberth, Jr. et al. |
| 2013/0300637 A1 | 11/2013 | Smits et al. |
| 2013/0329865 A1 | 12/2013 | Ristock et al. |
| 2013/0335507 A1 | 12/2013 | Aarrestad et al. |
| 2014/0012990 A1 | 1/2014 | Ko |
| 2014/0028781 A1 | 1/2014 | MacDonald |
| 2014/0040819 A1 | 2/2014 | Duffy |
| 2014/0068452 A1 | 3/2014 | Joseph et al. |
| 2014/0078182 A1 | 3/2014 | Utsunomiya |
| 2014/0096198 A1* | 4/2014 | Brunson ............ H04L 63/0281 726/4 |
| 2014/0104372 A1* | 4/2014 | Calman ............. H04N 7/155 348/14.08 |
| 2014/0108486 A1 | 4/2014 | Borzycki et al. |
| 2014/0157338 A1 | 6/2014 | Pearce |
| 2014/0161243 A1 | 6/2014 | Contreras et al. |
| 2014/0172967 A1* | 6/2014 | Yeung ............... H04L 65/403 709/204 |
| 2014/0198175 A1 | 7/2014 | Shaffer et al. |
| 2014/0237371 A1 | 8/2014 | Klemm et al. |
| 2014/0280595 A1* | 9/2014 | Mani ............... H04L 12/1827 709/204 |
| 2014/0282213 A1 | 9/2014 | Musa et al. |
| 2014/0317561 A1 | 10/2014 | Robinson et al. |
| 2014/0351327 A1 | 11/2014 | Huang et al. |
| 2014/0372908 A1 | 12/2014 | Kashi et al. |
| 2015/0004571 A1 | 1/2015 | Ironside et al. |
| 2015/0009278 A1 | 1/2015 | Modai et al. |
| 2015/0029301 A1 | 1/2015 | Nakatomi et al. |
| 2015/0035935 A1* | 2/2015 | Sontag .............. H04N 7/15 348/14.08 |
| 2015/0055769 A1* | 2/2015 | Sontag .............. H04M 3/42008 379/201.11 |
| 2015/0067552 A1 | 3/2015 | Leorin et al. |
| 2015/0074189 A1 | 3/2015 | Cox et al. |

(56) References Cited

U.S. PATENT DOCUMENTS

| | | | |
|---|---|---|---|
| 2015/0081885 | A1 | 3/2015 | Thomas et al. |
| 2015/0085060 | A1 | 3/2015 | Fish et al. |
| 2015/0089393 | A1 | 3/2015 | Zhang et al. |
| 2015/0089394 | A1 | 3/2015 | Chen et al. |
| 2015/0113050 | A1 | 4/2015 | Stahl |
| 2015/0117626 | A1* | 4/2015 | Nord ............... H04M 3/568 379/202.01 |
| 2015/0154521 | A1* | 6/2015 | Mu ................. H04L 12/1818 705/7.12 |
| 2015/0172120 | A1 | 6/2015 | Dwarampudi et al. |
| 2015/0304120 | A1 | 10/2015 | Xiao et al. |
| 2015/0304366 | A1 | 10/2015 | Bader-Natal et al. |
| 2015/0319113 | A1 | 11/2015 | Gunderson et al. |
| 2015/0373063 | A1 | 12/2015 | Vashishtha et al. |
| 2016/0050079 | A1 | 2/2016 | Martin De Nicolas et al. |
| 2016/0050160 | A1 | 2/2016 | Li et al. |
| 2016/0050175 | A1 | 2/2016 | Chaudhry et al. |
| 2016/0057391 | A1* | 2/2016 | Block ............. H04L 65/4023 348/14.07 |
| 2016/0072862 | A1 | 3/2016 | Bader-Natal et al. |
| 2016/0094593 | A1 | 3/2016 | Priya |
| 2016/0105345 | A1 | 4/2016 | Kim et al. |
| 2016/0110056 | A1 | 4/2016 | Hong et al. |
| 2016/0173537 | A1 | 6/2016 | Kumar et al. |
| 2016/0182580 | A1 | 6/2016 | Nayak |
| 2016/0277461 | A1 | 9/2016 | Sun et al. |
| 2016/0283909 | A1 | 9/2016 | Adiga |
| 2016/0307165 | A1 | 10/2016 | Grodum et al. |
| 2016/0309037 | A1 | 10/2016 | Rosenberg et al. |
| 2016/0344567 | A1* | 11/2016 | Navale ........... H04L 12/1822 |
| 2016/0373387 | A1* | 12/2016 | Reyes ................ H04L 51/08 |
| 2016/0373516 | A1* | 12/2016 | Reyes ............. G06F 21/6209 |
| 2017/0006162 | A1 | 1/2017 | Bargetzi et al. |
| 2017/0006446 | A1 | 1/2017 | Harris et al. |
| 2017/0070706 | A1 | 3/2017 | Ursin et al. |
| 2017/0104961 | A1 | 4/2017 | Pan et al. |
| 2017/0118271 | A1* | 4/2017 | Reyes ............... H04L 67/06 |
| 2017/0324850 | A1 | 11/2017 | Snyder et al. |

FOREIGN PATENT DOCUMENTS

| | | |
|---|---|---|
| CN | 102655583 | 9/2012 |
| CN | 101729528 | 11/2012 |
| CN | 102938834 | 2/2013 |
| CN | 103141086 | 6/2013 |
| CN | 204331453 | 5/2015 |
| EP | 959585 | 11/1999 |
| EP | 2341686 | 8/2016 |
| WO | WO 2012/167262 | 12/2012 |
| WO | WO 2014/118736 | 8/2014 |

OTHER PUBLICATIONS

Author Unknown, "'I can see the future" 10 predictions concerning cell-phones," Surveillance Camera Players, http://www.notbored.org/cell-phones.html, Jun. 21, 2003, 2 pages.

Author Unknown, "Active screen follows mouse and dual monitors," KDE Community Forums, Apr. 13, 2010, 3 pages.

Author Unknown, "Implementing Media Gateway Control Protocols" A RADVision White Paper, Jan. 27, 2002, 16 pages.

Author Unknown, "Manage Meeting Rooms in Real Time," Jan. 23, 2017, door-tablet.com 7 pages.

Averusa, "Interactive Video Conferencing K-12 applications," "Interactive Video Conferencing K-12 applications" copyright 2012. http://www.averusa.com/education/downloads/hvc brochure goved.pdf (last accessed Oct. 11, 2013).

Cisco Systems, Inc., "Cisco WebEx Meetings Server System Requirements release 1.5." 30 pages, Aug. 14, 2013.

Cisco White Paper, "Web Conferencing: Unleash the Power of Secure, Real-Time Collaboration," pp. 1-8, 2014.

Clarke, Brant, "Polycom Announces RealPresence Group Series," "Polycom Announces RealPresence Group Series" dated Oct. 8, 2012 available at http://www.323.tv/news/polycom-realpresence-group-series (last accessed Oct. 11, 2013).

Clauser, Grant, et al., "Is the Google Home the voice-controlled speaker for you?," The Wire Cutter, Nov. 22, 2016, pp. 1-15.

Cole, Camille, et al., "Videoconferencing for K-12 Classrooms," Second Edition (excerpt), http://www.iste.org/docs/excerpts/VIDCO2-excerpt.pdf (last accessed Oct. 11, 2013), 2009.

Epson, "BrightLink Pro Projector," BrightLink Pro Projector. http://www.epson.com/cgi-bin/Store/jsp/Landing/brightlink-pro-interactive-projectors.do?ref=van brightlink-pro—dated 2013 (last accessed Oct. 11, 2013).

Infocus, "Mondopad," Mondopad. http://www.infocus.com/sites/default/files/InFocus-Mondopad-INF5520a-INF7021-Datasheet-EN.pdf (last accessed Oct. 11, 2013), 2013.

MacCormick, John, "Video Chat with Multiple Cameras," CSCW '13, Proceedings of the 2013 conference on Computer supported cooperative work companion, pp. 195-198, ACM, New York, NY, USA, 2013.

Microsoft, "Positioning Objects on Multiple Display Monitors," Aug. 12, 2012, 2 pages.

Mullins, Robert, "Polycom Adds Tablet Videoconferencing," Mullins, R. "Polycom Adds Tablet Videoconferencing" available at http://www.informationweek.com/telecom/unified-communications/polycom-adds-tablet-videoconferencing/231900680 dated Oct. 12, 2011 (last accessed Oct. 11, 2013).

Nu-Star Technologies, "Interactive Whiteboard Conferencing," Interactive Whiteboard Conferencing. http://www.nu-star.com/interactive-conf.php dated 2013 (last accessed Oct. 11, 2013).

Polycom, "Polycom RealPresence Mobile: Mobile Telepresence & Video Conferencing," http://www.polycom.com/products-services/hd-telepresence-video-conferencing/realpresence-mobile.html#stab1 (last accessed Oct. 11, 2013), 2013.

Polycom, "Polycom Turns Video Display Screens into Virtual Whiteboards with First Integrated Whiteboard Solution for Video Collaboration," Polycom Turns Video Display Screens into Virtual Whiteboards with First Integrated Whiteboard Solution for Video Collaboration—http://www.polycom.com/company/news/press-releases/2011/20111027 2.html—dated Oct. 27, 2011.

Polycom, "Polycom UC Board, Transforming ordinary surfaces into virtual whiteboards" 2012, Polycom, Inc., San Jose, CA, http://www.uatg.com/pdf/polycom/polycom-uc-board-_datasheet.pdf, (last accessed Oct. 11, 2013).

Stevenson, Nancy, "Webex Web Meetings for Dummies" 2005, Wiley Publishing Inc., Indianapolis, Indiana, USA, 339 pages.

Stodle. Daniel, et al., "Gesture-Based, Touch-Free Multi-User Gaming on Wall-Sized, High-Resolution Tiled Displays," 2008, 13 pages.

Thompson, Phil, et al., "Agent Based Ontology Driven Virtual Meeting Assistant," Future Generation Information Technology, Springer Berlin Heidelberg, 2010, 4 pages.

Tno, "Multi-Touch Interaction Overview," Dec. 1, 2009, 12 pages.

Toga, James, et al., "Demystifying Multimedia Conferencing Over the Internet Using the H.323 Set of Standards," Intel Technology Journal Q2, 1998, 11 pages.

Ubuntu, "Force Unity to open new window on the screen where the cursor is?" Sep. 16, 2013, 1 page.

VB Forums, "Pointapi," Aug. 8, 2001, 3 pages.

Vidyo, "VidyoPanorama," VidyoPanorama—http://www.vidyo.com/products/vidyopanorama/ dated 2013 (last accessed Oct. 11, 2013).

* cited by examiner

UNAUTHORIZED PARTICIPANT DETECTION IN MULTIPARTY CONFERENCING BY COMPARING A REFERENCE HASH VALUE RECEIVED FROM A KEY MANAGEMENT SERVER WITH A GENERATED ROSTER HASH VALUE

TECHNICAL FIELD

The present disclosure pertains to multiparty network conferencing, and more specifically to providing detecting unauthorized participants in a multiparty conferencing session.

BACKGROUND

Multiparty conferencing allows participants from multiple locations to collaborate. For example, participants from multiple geographic locations can join a conference meeting and communicate with each other to discuss issues, share ideas, etc. These collaborative sessions may include one or two-way audio transmissions, video transmission, or other data supporting tools that support the sharing of content presented by one participant to other participants. Thus, conference meetings can simulate in-person interactions between people.

A conferencing session is typically established by an enterprise or provider of conferencing services within an enterprise network or other private network. However, the resources required for private-network conferencing requires large costs and investments with respect to private network bandwidth and equipment within the private network.

Switched or cloud-based conferencing solutions involves the use of public networks and may be more cost effective because the hardware, application, and bandwidth costs may be covered by the conferencing provider and an enterprise may pay for what is actually used versus needing to pay for even idle time in private-network conferencing. Furthermore, cloud-based conferencing solutions are more easily scalable. However, deploying conference resources in a cloud environment that uses public networks introduces additional security risks.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview:

The disclosed technology addresses the need in the art for a more secure and cost efficient way to provide multiparty conferencing sessions.

Switched or cloud-based conferencing solutions provide a more cost effective and scalable alternative to private-network conferencing. However, deploying conference resources in a cloud environment introduces additional security risks resulting from some network entities being in a public network.

Various aspects of the subject technology relate to mitigating these and other security risks by having an endpoint compare a roster list provided via a first communication channel (e.g., a Session Initiation Protocol (SIP) communication) and a participant list provided via a second communication channel (e.g., a participant list from a key management server). To improve efficiency and protect sensitive information in the lists, a hash of both the roster list and the participant list may be compared instead of the lists themselves. If the hash values match, the roster list is valid and the conference can continue. If the hash values do not match, there may be an unauthorized listener and a meeting organizer may take steps to address the violation.

DETAILED DESCRIPTION

Figure 1:
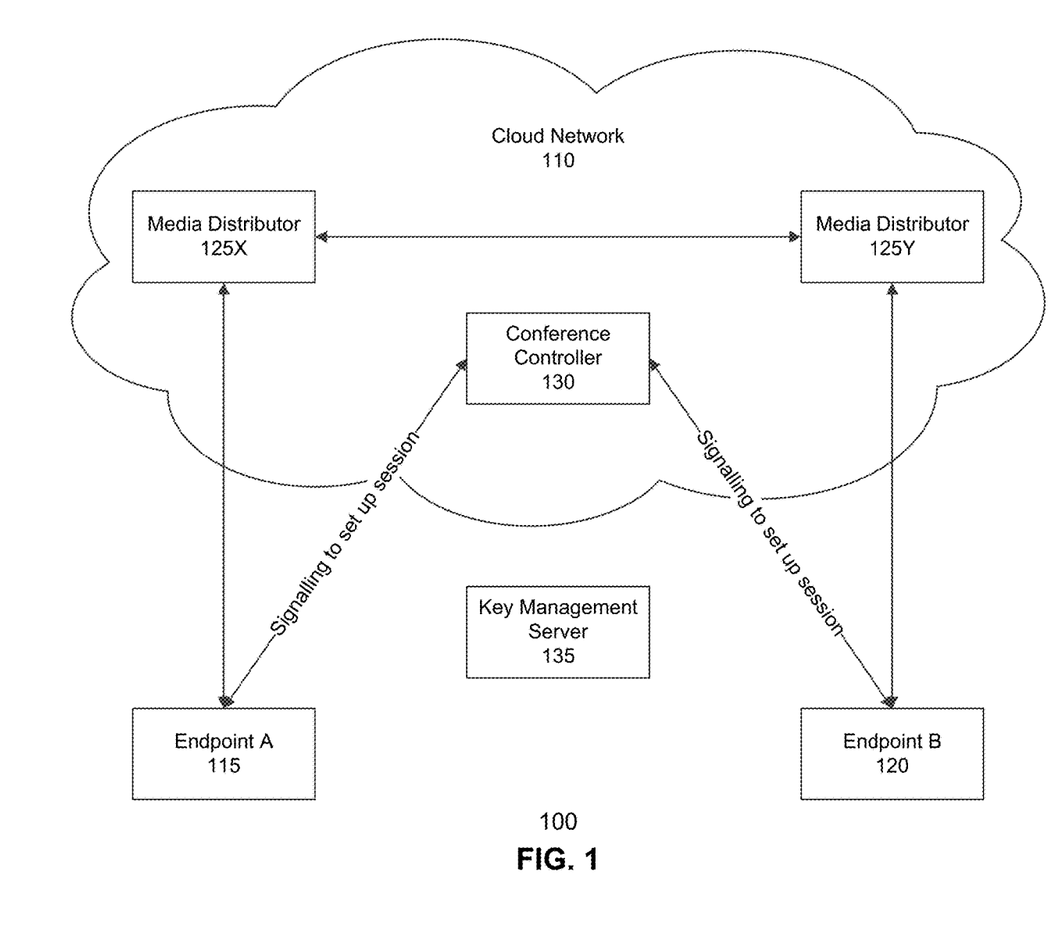
FIG. 1 is a conceptual block diagram illustrating an example network environment for providing conferencing capabilities, in accordance with various embodiments of the subject technology.

FIG. 1 is a conceptual block diagram illustrating an example network environment 100 for providing conferencing capabilities, in accordance with various embodiments of the subject technology. In example embodiments, the network environment 100 includes a cloud network 110 through which the other entities in the network environment 100 may communicate.

The network environment 100 includes one or more endpoints 115 and 120 as well as network entities configured to provide conferencing services. These network entities may include one or more media distributors 125, one or more conference controllers 130, and one or more key management servers 135. The various network entities may be physical machines (e.g., a server or computer), virtual machines, applications, containers, or other entity configured to perform the functions of a network entity.

Although the cloud network 110 may include one or more enterprise or otherwise private networks, the cloud network may also include a public network or semi-public network. The public network may include, for example, any one or more of a cellular network, a satellite network, a wide area network (WAN), a broadband network (BBN), the Internet, and the like. Communication network 110 may be implemented using any number of communications links associated with one or more service providers, including one or more wired communication links, one or more wireless communication links, or any combination thereof. Additionally, network 110 can be configured to support the transmission of data formatted using any number of protocols.

The one or more endpoints 115 and 120 may be customer or users devices configured to provide the conferencing data to a user. Example endpoints 115 and 120 may include, but are not limited to, computers, laptops, tablets, smartphones or other mobile devices, set-top boxes, smart appliances (e.g., smart televisions), multipoint control units (MCUs), media gateways, media recording devices, conference room devices, or other conferencing equipment.

The endpoints 115 and 120 may be configured to communicate via various protocols such as, for example, the real-time transport protocol (RTP). Each endpoint may be a source and/or a destination of an RTP communication flow and have access to one or more encryption keys (e.g., end-to-end media encryption keys) to encrypt or decrypt the conferencing data. Other communication channels and/or protocols may also be used. For example, the endpoints 115 and 120 may use SCTP over DTLS for web RTC communications, BFCP, various file transfer protocols or application data channels, etc.

The one or more media distributors 125, also known as media distribution devices or media distribution servers, are network entities configured to receive and forward RTP data towards their destination. According to some embodiments, the media distributors 125 are not allowed to have access to the end-to-end media encryption keys and, as a result, do not have access to encrypted conferencing data. Furthermore, they may be restricted on what other types of data it can access or alter. For example, a media distributor may be restricted from altering certain fields in an RTP header containing conferencing data.

The one or more conference controllers 130 are network entities configured to establish and manage a conferencing session or perform call processing functions. Although various conferencing protocols may be used, for clarity, various aspects of the subject technology will be described with respect to a Session Initiated Protocol (SIP) configured to aid in the signaling and control of multimedia communication sessions.

The conference controllers 130 may be configured to maintain a SIP signaling relationship with each participant in the conference and ensure that the media streams that constitute the conference are available to the participants (e.g., the endpoints) in the conference. The conference controllers 130 may use of one or more mixers, each of which combines a number of input media streams to produce one or more output media streams. The focus uses the media policy to determine the proper configuration of the mixers.

The conference controllers 130 may use various notifications to the various network entities to coordinate the conferencing session. The conference controllers 130 may, for example, accept subscriptions from endpoints for a notification service associated with a conferencing session and generate notifications to them as the state of the conference changes. The state of the conference may include the participants connected to the conference and also information about the dialogs associated with them. As new participants join, this state changes, and is reported through the notification service. Similarly, when a participant leaves, the state of the conference also changes, allowing subscribers to learn about this fact. If a participant is anonymous, the conference notification service may either withhold the identity of a new participant from other conference participants, or will neglect to inform other conference participants about the presence of the anonymous participant.

The conference controller 130 may include one or more physical and/or logical components depending on the specific implementation. The conference controller 130 may be implemented as a centralized server or conference server or one or more SIP servers.

The one or more key management servers 135 are network entities configured to distribute keys and related information to other network entities as appropriate. For example, two different types of key information may be used. End-to-end key information (e.g., end-to-end encryption keys) is configured to secure communications from a source endpoint through one or more media distributors to a destination endpoint. Hop-to-hop key information (e.g., hot-to-hop and/or per-hop encryption keys) is configured to secure communications between an endpoint and a media distributor or between media distributors. The key management server 135 is configured to provide end-to-end key information to endpoints.

The key management server 135 may be implemented as a standalone key distributor network entity, collocated with an endpoint, or collocated with another network entity. Furthermore, the key management server 135 may be managed by an enterprise network or a third-party network that is separate from cloud network 110. However, because the key management server 135 plays an important role in securing conferencing data, the key management server 135 may be configured to be more secure and managed in a way to prevent or mitigate exploitation.

In order to provide more secure conferencing sessions using the cloud network 110, various aspects of the subject technology use trusted and untrusted statuses and assign these statuses to the various network entities in the cloud environment 100. Although various aspects use the terms "trusted" and "untrusted," in other aspects, other terms such as trusted and semi-trusted, secured and unsecured, or other terms may be used to indicate a higher level of trustworthiness and a lower level of trustworthiness.

Aspects of the subject technology allow for untrusted or semi-trusted network entities allows for these entities to be hosted in the cloud network 110 and allows the conferencing system to leverage the benefits provided by cloud network 110, which may include a public network or a network of a conferencing provider where the trustworthiness is below the level required to ensure that the privacy of a participant's media will not be compromised.

Although the term "untrusted" or "semi-trusted" is used to describe these entities, these entities are still used in a conferencing session to reliably connect endpoints or in other non-media related aspects of hosting a conferencing session, but not trusted with key information needed to decrypt any of the participant's media (e.g., end-to-end key information). The one or more media distributors 125A and 125B and conference controller 130 are examples of untrusted entities.

Each media distributor is configured to forward conferencing data (e.g., RTP data flows) between endpoints participating in a conferencing session while performing per-hop authentication of each data packet (e.g., an RTP packet). The media distributor may obtain per-hop key information from the key management server 135. The media distributor may access to one or more data packet headers or header extensions and potentially add or modify portions of the data packet headers or extensions. The media distributor may also relay communications between an endpoint and the key management server 135. However, the key management server 135 does not provide the media distributor with end-to-end key information (e.g., end-to-end encryption keys configured to encrypt and/or decrypt the media content of the conferencing data).

The key management server 135 also does not provide the conference controller 130 with end-to-end key information. The conference controller 130 may be configured to process conferencing signaling messages, sign the conferencing signaling messages, and/or authenticate endpoints for call signaling or joining a conferencing session hosted through a set of media distributors.

Trusted entities are allowed access to end-to-end key information such as encryption keys configured to encrypt and/or decrypt the media content of the conferencing data flows. The one or more endpoints 115 and 120 and the key management server 135 are considered trusted entities.

The one or more endpoints 115 and 120 are considered trusted entities and have access to end-to-end key information. Although an endpoint may have additional security features, it may still be compromised. However, the endpoint will need to have the end-to-end key information to decrypt the media content of the conferencing data flows and present the media content to a user.

As described above, the key management server 135 is a trusted entity and configured to provide key information to media distributors 125 and the various endpoints 115 and 120 involved in a conferencing session. To enable end-to-end privacy and integrity, the key management server 135 restricts end-to-end key information to trusted entities. However, media distributors 125 do have access to RTP headers and header extensions and are able to authenticate packets hop-by-hop using hop-to-hop key information.

According to various aspects of the subject technology, end-to-end keys (E2E Keys) may be generated for each endpoint and configured to authenticate encryption of RTP media between endpoints. For example, an E2E Key(i) may be generated for endpoint i. Hop-to-hop keys (H2H Keys) may be generated for each hop between an endpoint and a media distributor or between media distributors. For example, H2H Key(j) may be generated for hop j.

Figure 2:
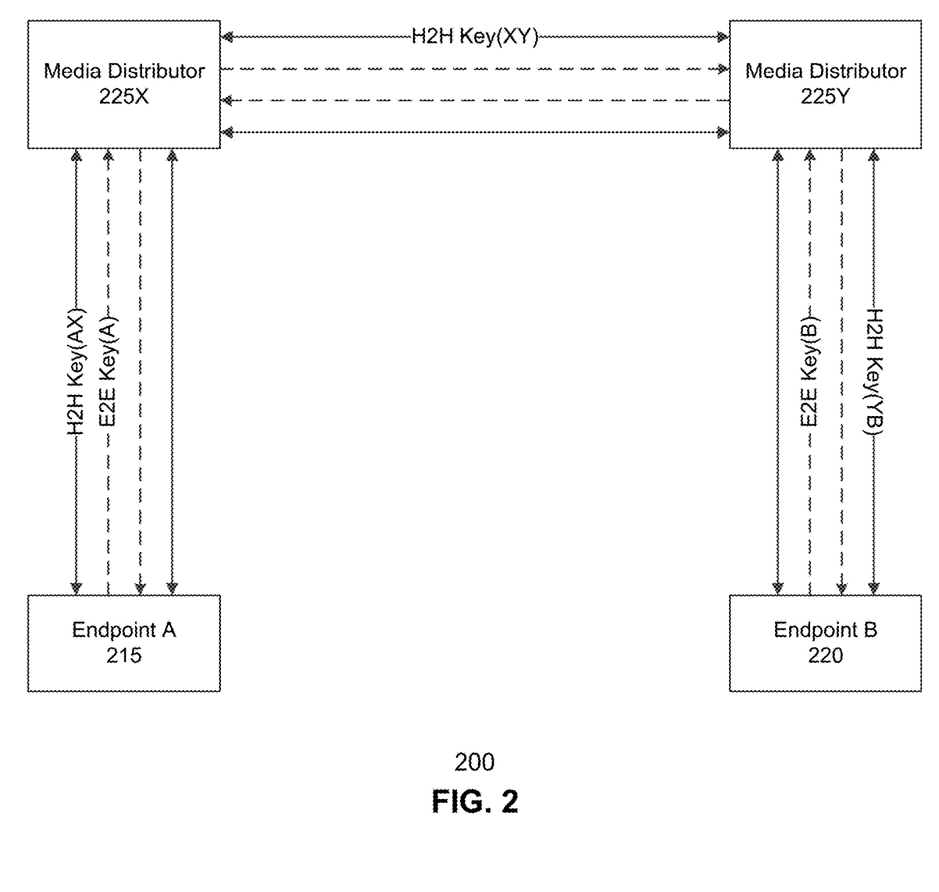
FIG. 2 is a conceptual block diagram of an example network environment illustrating use of various keys, in accordance with various embodiments of the subject technology.

FIG. 2 is a conceptual block diagram of an example network environment 200 illustrating use of various keys, in accordance with various embodiments of the subject technology. As illustrated in FIG. 2, the media content sent from endpoint A 215 to endpoint B 220 is encrypted with E2E Key(A). Similarly, the media content sent from endpoint B 220 to endpoint A 215 is encrypted with E2E Key(B).

A second layer of encryption is added on to the communication flow between the endpoints. For example, each hop between network entities is further encrypted by hop-to-hop keys. Conferencing data from endpoint A 215 to media distributor 225X is encrypted with H2H Key(AX), conferencing data from media distributor 225X to media distributor 225Y is encrypted with H2H Key(XY), and conferencing data from media distributor 225Y to endpoint B 220 is encrypted with H2H Key(YB).

According to various aspects of the subject technology, a Secure Real-time Transport Protocol (SRTP) may be used for the keying material and recommended cryptographic transform(s) for the H2H and E2E keys such that an endpoint may use an appropriate E2E key may be used to encrypt RTP media content and that encrypted output may be encrypted again using the appropriate H2H key. A media distributor may simply decrypt and/or encrypt the conferencing data flow using the appropriate H2H keys. According to other aspects however, other protocols may also be used.

According to various aspects of the subject technology, a key encryption key (KEK) may be used to ensure the confidentiality between E2E keys shared between endpoints. The KEK may be an Encrypted Key Transport (EKT) key configured to encrypt SRTP keys (e.g., the E2E keys) used for E2E authentication encryption of media sent by an endpoint.

To establish or generate an E2E key and H2H key for an endpoint and/or an H2H key for a media distributor, an association may be formed between an endpoint and the key management server. Media distributors may communicate directly with another media distributor to establish H2H keys for transmitting data to that media distributor. Protocols, such as Datagram Transport Layer Security (DTLS) Extension to Establish Keys for the Secure Real-time Transport Protocol (SRTP) and/or DTLS-SRTP may be used, in accordance with some aspects of the subject technology.

Figure 3:
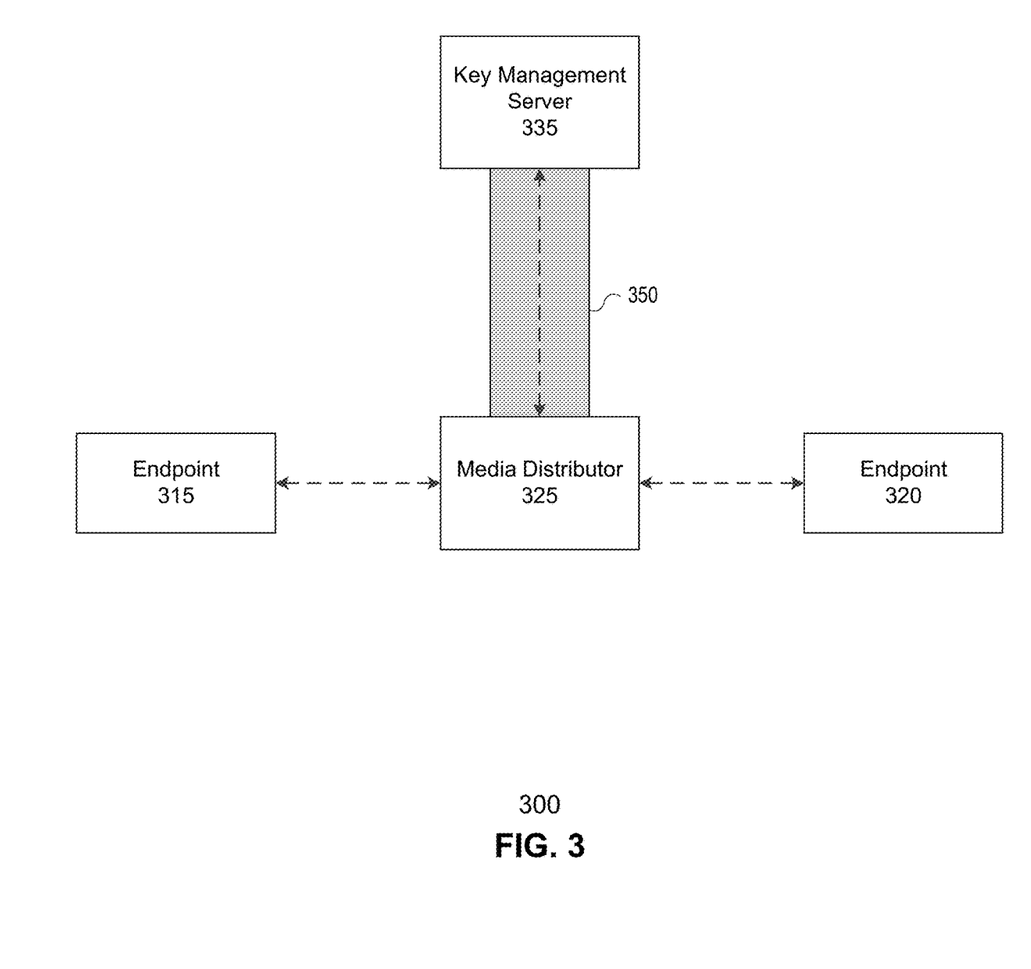
FIG. 3 is a conceptual block diagram of an example network environment illustrating an initial key exchange, in accordance with various embodiments of the subject technology.

FIG. 3 is a conceptual block diagram of an example network environment 300 illustrating an initial key exchange, in accordance with various embodiments of the subject technology. One or more tunnels 350 between a media distributor 325 and a key management server 335 may be established to enable the media distributor to facilitate the establishment of a secure DTLS association between each endpoint (endpoint 315 and/or 320) and the key management server 335.

The association between each endpoint and the key management server 335 will enable each endpoint to receive E2E key information, Key Encryption Key (KEK) information (e.g., an EKT key), and H2H key information. The key management server 335 may also securely provide the H2H key information to the media distributor 325.

The endpoints 315 and 320 may establish an association over the RTP session's media ports for the purposes of key information exchange with the key management server 335. The media distributor forwards packets received from an endpoint on to the key management server 335 and vice versa via the tunnel 350 established between media distributor 325 and the key management server 335. The tunnel 350 may be configured to implement the signaling between the key management server 335 and the endpoints. The tunnel 350 may also be used to convey H2H key information from the key management server 335 to the media distributor 325.

After the initial key information exchange with the key management server 335, the endpoints 315 and 320 may be able to encrypt media end-to-end with their respective E2E key information, and send their respective E2E key information to other endpoints via the encrypted key transport (EKT) mechanism. The endpoints 315 and 320 will also be able to encrypt and authenticate RTP packets using the H2H key information.

However, there may be several shortcomings to the disclosed conferencing session. For example, a conferencing session may use various methods to authorize a participant to the conferencing session. For example, identity assertions or certificate fingerprints may be used by the key management server to verify that endpoints are authorized to participate in the conference. However, as discussed above, media distributors relied upon to establish associations between a key management server and endpoints and pass key information between the key management server and endpoints even though the media distributors are not trusted entities, may reside in a less secure network or portion of the network, and may be open to additional attacks.

If a media distributor were to become compromised, the media distributor may forward messages from endpoints that are not authorized to participate in a particular conferencing session to the key management server. The key management server may authenticate the user/endpoint, however the key management server relies on the media distributor to determine whether a user/endpoint is authorized as a participant in a conferencing session. Accordingly, an authenticated endpoint that is not a valid participant in a conferencing session may be added as a participant and receive conferencing data as well as key information that the endpoint may use to decrypt the conferencing data.

In another example, conference participants may not be aware of other recipients of conferencing session data to whom the key management server may have given KEK information to. This can lead to a scenario where an eavesdropper can listen to and view a conferencing session without other participants (e.g., the speakers) being aware that the eavesdropper is receiving the media stream. For example, a conferencing session may be compromised either because of an internal attack (e.g., disgruntled employee launching inside attack) or an external agency inserting implants to eavesdrop on a media session.

Various aspects of the subject technology address these and other technical problems by providing a mechanism for participants in a conferencing session to validate a participant list or conference roster. A participant in a conferencing session may validate a conference roster list by comparing a roster or a proxy for the roster received from a key management server with a roster or proxy for the roster received from another conferencing channel (e.g., a SIP communication channel). If there is a match, the roster is valid. If there is no match, the roster is invalid and the system or participant may take one or more actions to resolve the issue.

Although various aspects are described with respect to hash functions (e.g., a SHA-2 hash function) or hash values (e.g., a reference hash value, a roster hash value, etc.), other proxies for the roster or participant list may also be used. For example, the roster or participant list may be encoded by various techniques to generate various codes.

Figure 4:
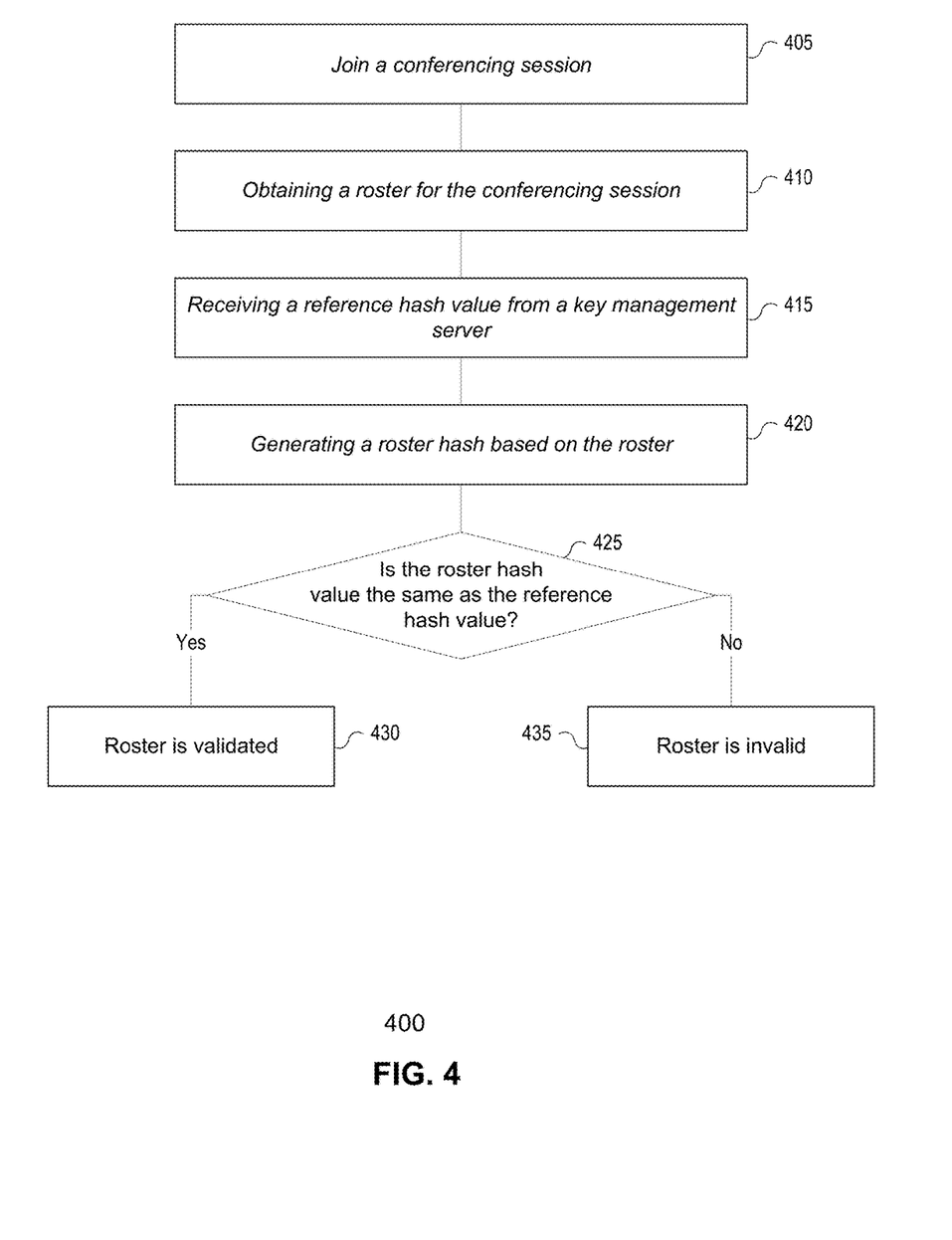
FIG. 4 shows an example method for validating conference participants, in accordance with various aspects of the subject technology.

FIG. 4 shows an example method 400 for validating conference participants, in accordance with various aspects of the subject technology. Although the methods and processes described herein may be shown with certain steps and operations in a particular order, additional, fewer, or alternative steps and operations performed in similar or alternative orders, or in parallel, are within the scope of various embodiments unless otherwise stated. The method 400 may be implemented by a system which may be implemented as, for example, an endpoint device.

At operation 405, the system may join a conferencing session. There are various ways to join a conferencing session using various protocols. One such protocol discussed for illustrative purposes includes the Session Initiation Protocol (SIP) which supports the initiation, modification, and termination of conferencing sessions between endpoints. The conferencing sessions may be managed by SIP dialogs, which represent a SIP relationship between a pair of entities (e.g., endpoints) in the network. SIP may be used in communications between two or more endpoints and in architectures where there is no central point of control, in distributed multiparty conferencing where each participant may maintain signaling relationships with other participants, in architectures that include a central point of control, or a combination thereof.

For example, the system may send an invite to a conference controller (e.g., a SIP focus entity configured to maintain a SIP signaling relationship with each participant in the conference). The conference controller may authenticate the system for the purpose of conference signaling based on, for example, conference policies stored in a conference policy database. If the system is authenticated, the system is added to the conference, which may be represented by a universal resource identifier (URI). Alternatively, the conference controller may also send an invite to the system, the system may transmit an invite acceptance to the conference controller, and the conference controller may add the system to the conference.

The conference is hosted through one or more media distributors and, as a result, the key management server and the media distributors hosting the conference are configured to establish one or more tunnels (e.g., Transport Layer Security (TLS) protocol connections) between each other to facilitate an initial key exchange and key exchanges during the conference, as described above. Once the tunnels between the media distributors and the key management server are established, the system may use one or more of the tunnels to establish encryption and authentication keys with the key distributor, for example, by using DTLS-SRTP protocols. Once the appropriate keying information is provided to the system, the media distributors, and other endpoints in the conference, the conferencing session may proceed.

At operation 410, the system may obtain a roster for the conferencing session. The roster may be implemented as a list of participants in the conferencing session and may be obtained at once (e.g., the whole roster), piecemeal (e.g., one participant at a time), and/or updated continually (e.g., receiving whole roster updates, adding one participant to the roster, removing one participant from the roster, etc.).

According to some aspects of the subject technology, the system may obtain a roster through SIP signaling messages from a conference controller. For example, as provided by a SIP framework, the conference controller may provide a conference notification service and may accept subscriptions from endpoints in the conferencing session, monitor the state of the conference, generate notifications as the state of the conference changes, and transmit the notifications to the subscribers for the conferencing session.

The state of the conference includes the participants of the conferencing session (e.g., the endpoints that the conference controller has added to the conferencing session) as well as information about the dialogs associated with the participants. As new participants are added by the conference controller the state changes and the change is reported through the notification service. Similarly, when a participant leaves or is removed by the conference controller the state changes and this change is also reported to subscribers.

The system may be subscribed to the conference notification service provided by the conference controller when the conference controller added the system to the conferencing session or via a separate transaction. Once subscribed to the conference notification service, the system may receive notifications from the conference controller indicating that a participant has been added or removed from the conferencing session. The system may use these notifications to generate the roster.

As participants are added to the conferencing session, the participants obtain keying information by contacting the key management server via one of the tunnels established between the key management server and the media distributors. When contacted by a participant, the key management server validates the participant and provides appropriate key information to the participant.

The key management server may also extract the identity of the participant and add identity to a list of participants in the conferencing session. As described above, the validation of the participant may be through identity assertions, certificate fingerprints, or other means. Accordingly, the key management server may extract the identity of the participant from the certificate or request and receive the identity of the participant from an identity provider.

The key management server may sort the list of participants in various ways and generate a reference hash value of the list of participants. According to some implementations, the list of participants may be sorted by alphabetical order. However other factors or combinations of factors may also be used to sort the list of participants. The reference hash value may be generated based on a SHA-2 hash function, or some other hash function. The key management server may transmit this reference hash value to the system.

At operation 415, the system receives the reference hash value from the key management server. At operation 420, the system may sort the participants in the roster obtained in operation 410 and generate a roster hash value based on that roster. The system may sort the participants in the roster in a similar manner to the key management server such as, for example, in alphabetical order. Similarly the system may use the same hash function as the key management server (e.g., a SHA-2 hash function).

At operation 425, the system compares the roster hash value to the reference hash value received from the key management server to determine whether the roster hash value is equivalent to the reference hash value. If the roster hash value is the same as the reference hash value, then the key management server is likely to have the same list of participants as the conference controller and the system. Accordingly, at operation 430, the system validates the roster (e.g., determines that the roster is valid) and may continue the conferencing session.

If the roster hash value is not equivalent to the reference hash value, it is likely that the key management server does not have the same list of participants as the conference controller and the system. This may indicate the possibility of the existence of an eavesdropper or that the conferencing session is otherwise compromised. For example, the key management server may have provided key information for one or more endpoints that are not in the roster that the system has obtained in operation 410. Accordingly the system, at operation 435, determines that the roster for the conferencing session is invalid (e.g., the roster cannot be validated) and may respond accordingly.

According to some implementations, the system may notify the other participants in the conferencing session that the conferencing session may be compromised, leave the conferencing session, end the conferencing session, or attempt to resolve the conflict. For example, the system may notify an application running on the system (e.g., conferencing software, a browser, etc.) or a user of the system that there may be an unknown listener on the conferencing session and the user may ask that the unknown user to leave the conferencing session. Alternatively, or additionally, the system may notify other applications running on the other endpoints that there may be an unknown listener on the conferencing session and ask the unknown user to leave.

After a period of time configured to give the unknown user an opportunity to leave and the conferencing entities time to detect the leaving of the unknown user, the system may check again to see whether the roster can be validated. For example, the process may return to operation 410 to obtain a new roster for the conferencing session, receive a new reference hash value from the key management server, generate a new roster hash value based on the new roster, and attempt to validate the new roster based on a comparison of the new roster hash value and the new reference hash value.

In an illustrative scenario, a conferencing session may be established to interview several candidates. Once a candidate has finished his interview, the interviewer may ask the candidate to drop off of the conferencing session or remove the candidate from the conferencing session. To prevent the candidate from eavesdropping on the remainder of the conferencing session, the interviewer's conferencing application may request the candidate to drop off from the conferencing session and/or ensure that the candidate is no longer able to decrypt the media. The client application may perform cross-checks with the key management server to determine whether the candidate is still a part of the list of updated listeners authorized to receive the updated KEK. If the candidate is not a part of the list of updated listeners, the conferencing session may continue. If the candidate is still a part of the list of updated listeners, the client application may notify the interviewer and/or ask the candidate again to drop off the conferencing session until cross checks indicate that the candidate is no longer a part of the updated list of listeners.

According to some aspects, if the roster is invalid, the system may send the roster obtained to the key management server where the key management server may compare the roster from the system to the list of participants tracked by the key management server to specifically identify an unknown user. The unknown user may then be removed from the conferencing session. The key management server may also, or alternatively, send the list of participants it has tracked to the system where the system may compare the roster from the system to the list of participants tracked by the key management server to specifically identify an unknown user.

According to some aspects, the key management server may categorize participants into speakers (e.g., content generators) and receivers (e.g., content receivers) depending on the key information received by each participant. In some cases the participant may be both speaker and receiver. The key management server may build a separate list of identities for speaker participants and for receiver participants or the list of identities may specify whether each identity corresponds to a speaker participant, a receiver participant, or a participant that is both a speaker and a receiver. The reference hash value may be calculated based on the list of receivers and be transmitted to the system where it may be compared to the roster hash value in operation 425.

According to some aspects of the subject technology, not all participants in a conferencing session may be configured to validate the roster. For example, when the participant list is large, the key management server may nominate a specific set of participants in the conference call to validate the roster. The key management server may nominate the participants based on whether the participant is a speaker and/or whether the participant has a high reputation score. The reputation score may be calculated in various ways based on various signals.

According to some aspects, one participant in the nominated set of participants may validate the roster. For example, the key management server detect that a new participant or recipient participant has been added to the conferencing session or a participant has left the conferencing session. In response, the key management server may use a round-robin technique to select one participant in the nominated set of participants to validate the roster and transmit instructions to the selected participant to validate the roster. The next time the key management server detects a change to the list of participants in the conferencing session, the next participant in the nominated set of participants may validate the roster.

As discussed above, a conference controller residing in the cloud network may become compromised. In a compromised state, the conference controller may send a participant list that includes unauthorized participants to other participants of a conferencing session. According to various aspects of the subject technology, this attack may be addressed by allowing a new participant to join an on-going conferencing session only if one of the other participants in the conferencing session sends a new message signaling the identity of the new participant to all other participants through the conference controller. However, because the conference controller is not a trusted entity (e.g., the conference controller may be untrusted or semi-trusted), this new message must be signed by the participant's client application (e.g. the participant gets short-term certificate from an identity provider and uses an Elliptic Curve Digital Signature Algorithm (ECDSA) to sign the new message).

The other participants in the conferencing session may validate the digital signature of the new message and identify that the new participant is indeed added by an existing participant in the conferencing session. For example, a client application for a speaker in the conferencing session may compare the identity of the new participant received from the key management server with the identity of the participant received in the new message. If they do not match then the speaker's client application may transmit instructions to the key management server to not permit the new participant to receive the KEK.

Figure 5A:
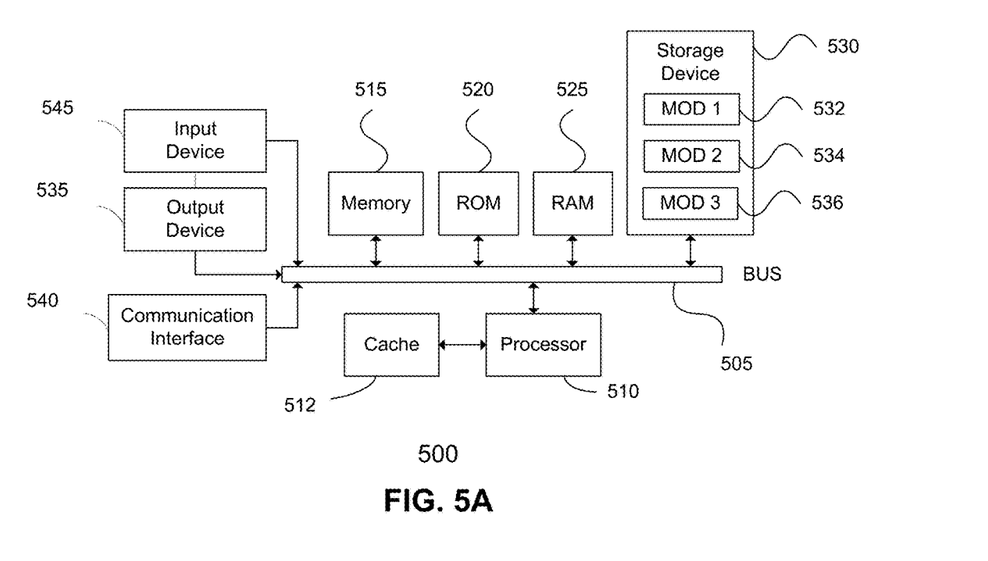
FIGS. 5A and 5B show example possible system embodiments.
Figure 5B:
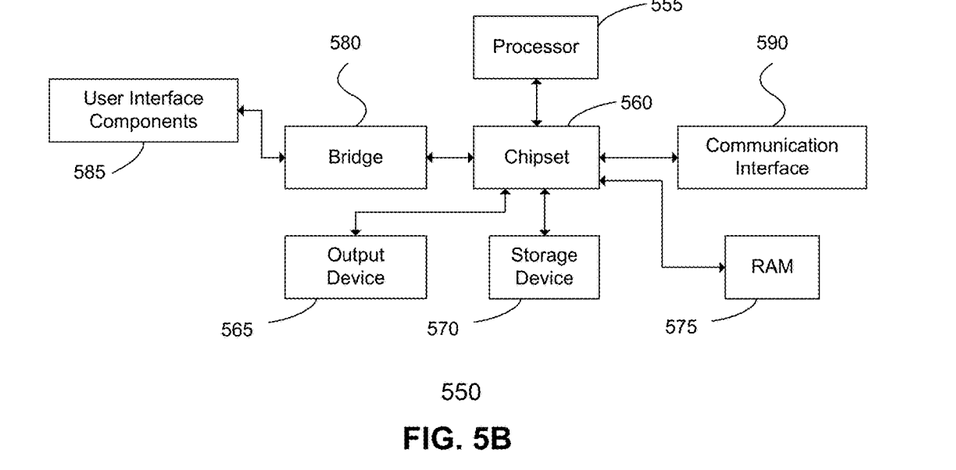

FIG. 5A, and FIG. 5B show example possible system embodiments. The more appropriate embodiment will be apparent to those of ordinary skill in the art when practicing the present technology. Persons of ordinary skill in the art will also readily appreciate that other system embodiments are possible.

FIG. 5A shows a conventional system bus computing system architecture 500 wherein the components of the system are in electrical communication with each other using a bus 505. Example system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer-readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B shows a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   joining a conferencing session;
   obtaining a roster for the conferencing session via a Session Initiation Protocol (SIP) channel;
   receiving a reference hash value from a key management server, wherein the reference hash value is based on a participant list generated by the key management server;
   generating a roster hash value based on the roster;
   comparing the reference hash value with the roster hash value; and
   determining that the roster is invalid when the reference hash value does not match the roster hash value.

2. The computer-implemented method of claim 1, wherein the reference hash value is received via a media distribution server configured to establish a transport layer security (TLS) tunnel with the key management server.

3. The computer-implemented method of claim 1, wherein generating the roster hash value comprises:
   sorting the roster in alphabetical order; and
   applying a SHA-2 hash function on the roster after the roster is sorted.

4. The computer-implemented method of claim 1, wherein joining the conferencing session comprises:
   transmitting an invite for the conferencing session to a conference controller; and
   obtaining key information from the key management server via a media distribution server configured to establish a transport layer security (TLS) tunnel with the key management server.

5. The computer-implemented method of claim 1, wherein obtaining the roster for the conferencing session comprises:
   receiving, from a conference controller, at least one SIP signaling message specifying a change in a state of the conferencing session.

6. The computer-implemented method of claim 5, wherein the change in the state of the conferencing session comprises an addition of a participant in the conferencing session.

7. The computer-implemented method of claim 5, wherein the change in the state of the conferencing session comprises a participant leaving the conferencing session.

8. The computer-implemented method of claim 1, further comprising:
   notifying a user that there is a possible unknown listener on the conferencing session.

9. The computer-implemented method of claim 8, further comprising:
   obtaining a new roster for the conferencing session;
   generating a new roster hash value based on the new roster;
   receiving a new reference hash value from the key management server; and
   attempting to validate the new roster based on a comparison of the new roster hash value and the new reference hash value.

10. The computer-implemented method of claim 1, further comprising:
    validating the roster when the reference hash value matches the roster hash value.

11. A system comprising:
    a processor; and
    a non-transitory computer-readable medium storing instructions for:
    joining a conferencing session;

obtaining a roster for the conferencing session via a first communications channel;

receiving a reference hash value via a second communications channel, wherein the reference hash value is based on a participant list;

generating a roster hash value based on the roster;

comparing the reference hash value with the roster hash value; and determining that the roster is invalid if the reference hash value does not match the roster hash value.

12. The system of claim 11, wherein the first communications channel is a Session Initiation Protocol (SIP) channel and wherein the second communications channel includes a transport layer security (TLS) tunnel between a key management server and a media distribution server.

13. The system of claim 11, wherein obtaining the roster for the conferencing session comprises receiving, from a conference controller, at least one SIP signaling message specifying a change in a state of the conferencing session.

14. The system of claim 11, wherein obtaining the roster for the conferencing session comprises receiving, from at least one endpoint participating in the conferencing session, a SIP signaling message specifying a change in a state of the conferencing session.

15. The system of claim 11, wherein generating the roster hash value comprises:

sorting the roster in alphabetical order; and applying a SHA-2 hash function on the roster after the roster is sorted.

16. The system of claim 11, wherein the non-transitory computer-readable medium further stores instructions for:

notifying a user that there is a possible unknown listener on the conferencing session.

17. The system of claim 11, wherein:

the system, based on a determination that a total number of participants of a conferencing session exceeds a threshold number, is selected by a key management server to validate the roster for the conferencing session; and wherein the non-transitory computer-readable medium further stores instructions for receiving instructions from the key management server to validate the roster.

18. The system of claim 11, wherein the system is an endpoint device participating in the conferencing session.

19. A non-transitory computer-readable medium comprising instructions, the instructions, when executed by a computing system, cause the computing system to:

obtain a roster for a conferencing session via a Session Initiation Protocol (SIP) channel;

receive a reference code from a key management server, wherein the reference code is based on a participant list generated by the key management server;

generating a roster code by encoding the roster;

comparing the reference code with the roster code; and determining that the roster is invalid when the reference code does not match the roster code.

20. The non-transitory computer-readable medium of claim 19, wherein the instructions further cause the computing system to notify a user that there is a possible unknown listener on the conferencing session.

* * * * *